US012325033B2

(12) United States Patent
Krettek

(10) Patent No.: US 12,325,033 B2
(45) Date of Patent: Jun. 10, 2025

(54) METHOD FOR FIXING A METAL SHEET AND FILTER DEVICE PRODUCED THEREWITH

(71) Applicant: Guntram Krettek, Viersen (DE)

(72) Inventor: Guntram Krettek, Viersen (DE)

( * ) Notice: Subject to any disclaimer, the term of this patent is extended or adjusted under 35 U.S.C. 154(b) by 960 days.

(21) Appl. No.: 17/275,692

(22) PCT Filed: Aug. 29, 2019

(86) PCT No.: PCT/DE2019/000230
§ 371 (c)(1),
(2) Date: Mar. 12, 2021

(87) PCT Pub. No.: WO2020/052699
PCT Pub. Date: Mar. 19, 2020

(65) Prior Publication Data
US 2021/0291201 A1 Sep. 23, 2021

(30) Foreign Application Priority Data
Sep. 14, 2018 (DE) ..................... 10 2018 007 294.1

(51) Int. Cl.
*B04B 7/16* (2006.01)
*B04B 7/18* (2006.01)

(52) U.S. Cl.
CPC . *B04B 7/16* (2013.01); *B04B 7/18* (2013.01)

(58) Field of Classification Search
None
See application file for complete search history.

(56) References Cited

U.S. PATENT DOCUMENTS 355,138 A * 12/1886 Cairns ........................ B04B 7/18 210/380.1
799,153 A * 9/1905 Fullner .................. B01D 33/06 210/386
830,230 A * 9/1906 Hoffbauer ................. B04B 7/18 210/380.1
858,154 A * 6/1907 Conversy ............. B01D 29/111 15/DIG. 8
1,194,275 A * 8/1916 Christianson ............. B04B 3/00 210/360.2
1,581,089 A * 4/1926 Roberts ...................... B04B 7/18 210/380.1
1,652,970 A * 12/1927 Workman ............. B01D 29/03 210/495
(Continued)

FOREIGN PATENT DOCUMENTS

CN 201350423 11/2009
CN 106195267 A 12/2016
(Continued)

*Primary Examiner* — Robert J Popovics
(74) *Attorney, Agent, or Firm* — Smartpat PLC

(57) ABSTRACT

A method for fixing a metal sheet serving as a filter element or the like to the inner peripheral wall of a filter device is disclosed. The metal sheet is arranged in a round shape, optionally with overlapping axial edge regions, on the inner peripheral wall of the housing of the filter device and is pressed against the peripheral wall of the housing with the aid of an expansion device. The disclosure further relates to a filter device produced in this way and to the expansion device used to carry out such a method.

14 Claims, 2 Drawing Sheets

(56) References Cited

U.S. PATENT DOCUMENTS 1,908,909 A * 5/1933 Manz ..................... E02D 29/12 49/465
1,946,500 A * 2/1934 Roberts ..................... B04B 7/18 210/489
2,028,168 A * 1/1936 Roberts ..................... B04B 7/18 494/36
2,068,636 A * 1/1937 Roberts ..................... B04B 7/18 210/380.1
RE20,432 E * 6/1937 Roberts ..................... B04B 7/18 210/380.1
2,139,464 A 12/1938 Eugene
2,472,558 A * 6/1949 Ackerly, Jr. ......... B01D 33/067 210/402
2,724,507 A * 11/1955 Cataldo ................ B01D 33/067 99/425
2,910,183 A * 10/1959 Hayes .................... B01D 33/11 210/315
3,033,373 A * 5/1962 Mueller ................. B01D 33/17 210/347
3,574,509 A * 4/1971 Zentis .................. B01D 29/682 210/415
3,631,981 A * 1/1972 Young ................... B01D 29/111 209/399
3,747,770 A * 7/1973 Zentis .................... B01D 33/50 210/402
3,773,428 A * 11/1973 Bowman ............. E02D 29/1409 404/26
3,837,499 A * 9/1974 Luthi ..................... B01D 33/09 210/404
3,843,520 A * 10/1974 Bottorf .................. B01D 35/05 210/393
3,955,754 A * 5/1976 Schaper .................... B04B 7/18 494/36
3,993,243 A * 11/1976 Dietzel ..................... B04B 7/18 494/36
4,097,171 A * 6/1978 Fier ..................... E02D 29/1409 404/26
4,157,966 A * 6/1979 Hassall ..................... B04B 7/16 210/380.1
4,225,266 A * 9/1980 Fier ..................... E02D 29/1409 404/26
4,293,111 A * 10/1981 Henri ..................... B01D 46/06 55/379
4,302,126 A * 11/1981 Fier ..................... E02D 29/1409 248/231.21
4,343,700 A * 8/1982 Daubman .............. B01D 33/11 210/232
4,358,371 A * 11/1982 Jameson ................ B01D 29/15 210/485
4,487,695 A * 12/1984 Connolly .................. B04B 7/18 209/393
4,529,519 A * 7/1985 Holz ........................ D21D 5/16 210/485
4,582,449 A * 4/1986 Vosswinkel ............. E02D 29/14 264/32
4,582,450 A * 4/1986 Neil .................... E02D 29/1409 404/26
4,795,560 A * 1/1989 Chupka .................... D21D 5/16 162/251
4,867,601 A * 9/1989 Bowman ............... E02D 29/124 404/26
4,885,090 A * 12/1989 Chupka ................ B23K 31/025 162/251
4,897,163 A * 1/1990 Verheesen ................ C25D 1/08 205/75
4,954,249 A * 9/1990 Gero ........................ D21D 5/16 209/397
4,966,489 A * 10/1990 Bowman ................. E02D 29/14 404/26
4,986,900 A * 1/1991 Mason ...................... B07B 1/18 209/406
5,011,065 A * 4/1991 Musselmann ......... B01D 29/111 29/896.6
5,064,537 A * 11/1991 Chupka ................ B23K 26/384 162/251
5,091,084 A * 2/1992 Krettek ................ B01D 33/067 210/402
5,094,360 A * 3/1992 Lange ................... B07B 1/4681 29/896.62
5,102,436 A * 4/1992 Grabowski ............ B01D 46/62 55/525
D327,693 S * 7/1992 Berry ........................... D15/141
5,150,927 A * 9/1992 Skinner ..................... F16L 5/10 277/606
5,169,524 A * 12/1992 Meiritz .................. B01D 29/96 55/497
5,200,072 A * 4/1993 Frejborg ................ B01D 29/15 210/489
5,209,845 A * 5/1993 Sims ...................... B01D 35/30 210/450
5,223,134 A * 6/1993 Riva ...................... B01D 29/15 210/232
5,308,488 A * 5/1994 Nelson ................. B01D 33/067 210/406
5,316,407 A * 5/1994 Miller ..................... E02D 29/14 404/25
5,326,470 A * 7/1994 Shaw ..................... D21D 5/026 210/396
5,370,796 A * 12/1994 Grimwood ............. B29C 70/86 210/380.1
5,378,364 A * 1/1995 Welling .................... B04B 3/04 210/512.1
5,417,858 A * 5/1995 Derrick .................. B01D 29/72 209/403
5,437,599 A * 8/1995 Feldkamp ............. F16F 15/027 494/83
5,482,622 A * 1/1996 Stark ..................... B01D 29/111 156/580.2
5,513,757 A * 5/1996 Papetti .................. B07B 1/4681 209/406
5,647,128 A * 7/1997 Aikawa .................. B01D 29/17 29/896.62
5,718,826 A * 2/1998 Frejborg .................. D21D 5/16 210/402
5,791,495 A * 8/1998 Gero .................... B01D 29/445 210/485
5,807,483 A * 9/1998 Cassidy ................. B01D 29/15 210/485
5,820,754 A * 10/1998 Cassidy ................. B01D 29/96 210/485
5,944,993 A * 8/1999 Derrick ................ B01D 29/012 209/403
5,954,956 A * 9/1999 Lutz ......................... D21D 5/16 209/406
5,968,357 A * 10/1999 Doelle ................... B01D 29/23 210/485
6,021,905 A * 2/2000 Frejborg .................. D21D 5/16 210/402
6,056,126 A * 5/2000 Schabel ............... B01D 29/445 209/406
6,063,298 A * 5/2000 Wilkie .................... B04B 15/06 210/791
6,105,788 A * 8/2000 Williamson ......... B01D 29/908 428/116
6,138,838 A * 10/2000 Soik ......................... D21D 5/16 209/406
6,318,562 B1 * 11/2001 Wilkie .................... B04B 15/06 210/370
6,338,412 B1 * 1/2002 Serres ...................... D21D 5/16 209/250
6,401,363 B1 * 6/2002 Miramondi ............. D06F 58/04 134/120
6,425,486 B1 * 7/2002 Andersson ............... D21D 5/16 209/406
6,491,168 B1 * 12/2002 Lutz ..................... B01D 29/445 210/402

(56) References Cited

U.S. PATENT DOCUMENTS

| | | | | | |
|---|---|---|---|---|---|
| 6,579,458 | B2 * | 6/2003 | Mickelat | D21D 5/16 | 210/402 |
| 6,663,774 | B2 * | 12/2003 | Flansburg | B04B 7/18 | 210/380.1 |
| 6,669,028 | B2 * | 12/2003 | Aikawa | D21D 5/16 | 209/406 |
| 6,736,968 | B2 * | 5/2004 | Mullins | B04B 7/18 | 210/232 |
| 6,745,469 | B1 * | 6/2004 | Soik | D21D 5/16 | 29/896.61 |
| 6,785,964 | B2 * | 9/2004 | Raphael | B01D 29/445 | 210/402 |
| RE38,738 | E * | 5/2005 | Serres | D21D 5/16 | 209/250 |
| 6,915,910 | B2 * | 7/2005 | Lutz | D21D 5/16 | 210/485 |
| 6,955,498 | B1 * | 10/2005 | McCuan | E02D 29/14 | 404/25 |
| 7,041,217 | B1 * | 5/2006 | Close | B01D 29/111 | 210/232 |
| 7,328,773 | B2 * | 2/2008 | Yamaguchi | F01L 1/344 | 184/105.3 |
| 7,347,916 | B2 * | 3/2008 | Grace | D21C 9/06 | 210/402 |
| 7,506,767 | B2 * | 3/2009 | Laakso | D21D 5/16 | 209/393 |
| 7,575,658 | B2 * | 8/2009 | Grace | D21C 9/06 | 134/119 |
| 7,743,480 | B2 * | 6/2010 | Park | D06F 37/263 | 29/505 |
| 8,297,445 | B2 * | 10/2012 | Maurais | D21D 5/16 | 209/273 |
| 8,365,366 | B2 * | 2/2013 | Fouqueray | F16L 23/08 | 24/284 |
| 8,469,198 | B2 * | 6/2013 | Hetu | B01D 33/067 | 209/273 |
| 8,516,661 | B2 * | 8/2013 | Maskell | F16B 2/08 | 24/23 R |
| 8,534,468 | B2 * | 9/2013 | Winkler | B01D 33/275 | 162/251 |
| 8,641,866 | B2 * | 2/2014 | Winkler | B01D 33/067 | 162/251 |
| 8,931,449 | B2 * | 1/2015 | Kinscher | F01L 1/344 | 210/232 |
| 8,936,161 | B2 * | 1/2015 | Kimura | B01D 29/112 | 210/430 |
| 8,950,123 | B1 * | 2/2015 | Chai | E04D 13/0409 | 52/12 |
| 8,950,588 | B2 * | 2/2015 | Yonezawa | F16K 11/07 | 210/485 |
| 8,978,697 | B2 * | 3/2015 | Hoppe | F01L 1/344 | 137/550 |
| 9,050,607 | B2 * | 6/2015 | Heley | B04B 7/16 | |
| 9,339,751 | B2 * | 5/2016 | Konzelmann | B01D 46/2403 | |
| 9,435,435 | B2 * | 9/2016 | Gavin | F16J 13/065 | |
| 9,669,337 | B2 * | 6/2017 | Giasson | B01D 33/067 | |
| 9,931,645 | B2 * | 4/2018 | Dietschreit | B04B 7/08 | |
| 9,950,285 | B2 * | 4/2018 | Yoshida | F16K 11/0716 | |
| 10,119,624 | B2 * | 11/2018 | Hoch | F16H 61/0009 | |
| 10,207,205 | B2 * | 2/2019 | Shrivastava | B01D 21/267 | |
| 10,683,655 | B2 * | 6/2020 | Peters, Jr. | E03F 5/106 | |
| 10,702,809 | B2 * | 7/2020 | Sakaguchi | B01D 33/06 | |
| 10,717,091 | B2 * | 7/2020 | Dehn | B04B 11/04 | |
| 11,213,856 | B2 * | 1/2022 | Colgrove | B01D 33/742 | |
| 11,213,857 | B2 * | 1/2022 | Colgrove | B07B 1/469 | |
| 11,247,236 | B2 * | 2/2022 | Colgrove | B01D 29/19 | |
| 11,633,681 | B2 * | 4/2023 | Grace | B01D 35/02 | 55/497 |
| 11,697,933 | B2 * | 7/2023 | Peters, Jr. | E03F 5/0404 | 210/163 |
| 11,707,766 | B2 * | 7/2023 | Colgrove | B01D 33/0315 | 210/808 |
| 11,839,901 | B2 * | 12/2023 | Futterer | B07B 1/12 | |
| 11,872,571 | B2 * | 1/2024 | Dehn | B04B 7/16 | |
| 12,138,661 | B2 * | 11/2024 | Colgrove | B01D 29/925 | |
| 2001/0032816 | A1 | 10/2001 | Mickelat et al. | | |
| 2003/0006182 | A1 * | 1/2003 | Gutierrez | B01D 29/96 | 210/232 |
| 2003/0115754 | A1 * | 6/2003 | Raphael | B01D 29/15 | 29/896.6 |
| 2003/0226593 | A1 * | 12/2003 | Okada | F16K 11/0712 | 137/550 |
| 2004/0188357 | A1 * | 9/2004 | Moore | E03F 5/14 | 210/163 |
| 2005/0011703 | A1 * | 1/2005 | Yamaguchi | F01L 1/344 | 184/6.9 |
| 2005/0040099 | A1 * | 2/2005 | Lutz | B01D 33/11 | 210/485 |
| 2006/0112559 | A1 * | 6/2006 | Hirata | B01D 39/10 | 228/234.1 |
| 2007/0012613 | A1 * | 1/2007 | Grace | B01D 33/073 | 210/404 |
| 2009/0084727 | A1 * | 4/2009 | Yonezawa | F16K 11/07 | 210/495 |
| 2010/0037435 | A1 * | 2/2010 | Fouqueray | F16L 23/08 | 24/19 |
| 2010/0278587 | A1 * | 11/2010 | Maskell | F16B 2/08 | 403/282 |
| 2011/0226204 | A1 * | 9/2011 | Hoppe | F01L 1/344 | 210/495 |
| 2012/0160762 | A1 * | 6/2012 | Kimura | B01D 29/112 | 210/432 |
| 2012/0174548 | A1 * | 7/2012 | Konzelmann | B01D 29/055 | 210/232 |
| 2012/0181237 | A1 * | 7/2012 | Winkler | B01D 33/275 | 210/773 |
| 2014/0064840 | A1 * | 3/2014 | McInnis | F16B 2/04 | 403/374.3 |
| 2015/0076051 | A1 * | 3/2015 | Provo | B01D 29/15 | 210/232 |
| 2015/0231537 | A1 * | 8/2015 | Dietschreit | B04B 7/08 | 210/236 |
| 2016/0008747 | A9 * | 1/2016 | Provo | B01D 29/13 | 210/232 |
| 2016/0051914 | A1 * | 2/2016 | Clement | B01D 33/466 | 74/17 |
| 2017/0368481 | A1 * | 12/2017 | Shrivastava | B01D 36/045 | |
| 2018/0207650 | A1 * | 7/2018 | Dehn | B04B 7/18 | |
| 2019/0060800 | A1 * | 2/2019 | Sakaguchi | B01D 24/46 | |
| 2019/0388809 | A1 * | 12/2019 | Rawls | B01D 33/067 | |
| 2020/0306770 | A1 * | 10/2020 | Dehn | B04B 7/18 | |
| 2021/0164569 | A1 | 6/2021 | Zuerker et al. | | |
| 2021/0268410 | A1 * | 9/2021 | Townson | B01D 33/44 | |
| 2021/0291201 | A1 * | 9/2021 | Krettek | B04B 7/16 | |
| 2022/0250090 | A1 * | 8/2022 | Mueller | B04B 7/16 | |
| 2023/0302384 | A1 * | 9/2023 | Rawls | B01D 33/09 | |
| 2024/0238807 | A1 * | 7/2024 | Berg | B04B 7/18 | |

FOREIGN PATENT DOCUMENTS

| | | | | |
|---|---|---|---|---|
| DE | 1777772 | U | 11/1958 | |
| DE | 2938684 | A1 | 4/1981 | |
| DE | 8811771 | U1 | 11/1988 | |
| DE | 19842042 | A1 | 3/2000 | |
| DE | 102009024760 | A1 | 12/2010 | |
| EP | 3170563 | A1 | 5/2017 | |
| GB | 2093719 | A * | 9/1982 | B04B 7/16 |

* cited by examiner

METHOD FOR FIXING A METAL SHEET AND FILTER DEVICE PRODUCED THEREWITH

TECHNICAL FIELD

The present disclosure relates to a method for fixing a metal sheet serving as a filter element, holding element, protective element, screen element, and the like to the inner peripheral wall of a filter device such as a centrifuge, a rotary filter and the like.

BACKGROUND

In such a method, a metal sheet, which can fulfill various functions and have a wide variety of structures, is inserted into the cylindrical housing or drum of a filter device and fixed therein in a rounded state to the inner peripheral wall of the housing. An example of such a method is described in DE 10 2009 024 760 A1, which involves inserting a protective screen into a centrifuge drum. Specifically, this publication describes a device for holding a filter foil or a filter cloth, which in the installed state in a centrifuge drum rests on a support device. The protective screen is inserted into the drum, and in the installed state it clamps the filter foil or the filter cloth and the support device between the sealing lips of the sealing element. The device also has at least one tension ring, which in the installed state presses the protective screen radially outward.

In this known solution, the metal sheet, which is designed here as a protective screen, is therefore fixed to the inner peripheral wall of the filter device with the aid of a tension ring.

In order for such a known method to function correctly, metal sheets having corresponding spring properties must be used so that they can be brought into the required round shape perfectly. Furthermore, these metal sheets must have a very high dimensional accuracy so that exact fixation is possible. In many cases, this is not the case or achieving this is correspondingly complicated. In addition, fixation with the aid of tension rings alone is not always reliable and is also complicated.

SUMMARY

The object of the disclosure is to provide a method of the type described above with which such metal sheets can be fixed especially easily, conveniently, and accurately.

This object is achieved by a method of the type specified, which comprises the following steps:

- Inserting the metal sheet into a housing of a filter device and arranging the same in a round shape, possibly with overlapping axial edge regions, on the peripheral wall of the housing;
- Inserting an expansion device into the housing and engaging same with the two axial edge regions of the metal sheet;
- Actuating the expansion device to spread the wall areas apart and press the metal sheet against the peripheral wall of the housing;
- Fixing the metal sheet in the spread-apart position; and
- Loosening and removing the expansion device (6).

In the method, an expansion device is used to spread the axial edge regions of the rounded sheet metal insertion apart in the circumferential direction of the housing or the drum and press it against the peripheral wall of the housing or against other filter elements, metal sheets, etc., already inserted in the housing. In this pressed state, the pressed metal sheet is then fixed in the spread-apart position, after which the expansion device is removed from the metal sheet and then removed from the housing of the filter device. When the expansion device is actuated, it comes into contact with the two axial edge regions of the sheet metal, for example by clamping, hooking, etc., so that during the subsequent spreading process the edge regions of the metal sheet move in the circumferential direction and the metal sheet is thus prestressed.

The housing of the filter device can be cylindrical, but can also be of other shapes (conical, etc.). The metal sheet can be formed as a single- or multi-piece sheet.

When the metal sheet has reached its prestressed end position by spreading it apart, it is fixed in this position. This can be done in a number of different ways. In one embodiment, the metal sheet is fixed in the spread-apart position by fastening it to the peripheral wall of the housing (or to elements or metal sheets inserted beforehand). For example, the metal sheet can then be screwed to the peripheral wall or other elements.

Another possibility is to clamp the metal sheet in position with the aid of tension rings.

In another variant of the method, the metal sheet is fixed in the spread-apart position by inserting a strip between the axial edge regions of the metal sheet. In this embodiment, it is assumed that a corresponding gap exists between the axial edges of the metal sheet in the spread-apart state, which is then closed by inserting a strip so that the metal sheet can no longer return to its relaxed position. The inserted strip thus fixes the metal sheet in its position pressed against the peripheral wall.

Such a strip for fixation can also be inserted in the form of several parts, for example when there is not enough space available to insert the strip. The strip or the individual strip pieces can be fixed to the metal sheet to prevent them from moving out of position.

The strip used can be a profile with two lateral grooves, for example, which engage the ends of the rounded metal sheet.

The expansion device thus causes the edge regions of the metal sheet to spread apart, as a result of which the metal sheet is pressed against the peripheral wall of the housing or other elements already arranged there. Preferably, an expansion device is used which has two locking pins which can be brought into engagement with the edge regions of the metal sheet. These locking pins are brought into engagement with the respective edge regions after arranging the expansion device over the edges of the metal sheet, for example hooked to the metal sheet if it is a perforated plate, screen plate, etc., and then moved apart by actuating the expansion device so that the edge regions spread apart accordingly. Depending on the desired type of fixation of the metal sheet, the spreading process can be performed so that the edges of the metal sheet are butt-to-butt, form a gap between them, or remain overlapped.

The expansion device as such can be operated manually or driven by a motor.

The present disclosure further relates to a filter device, in particular centrifuges, rotary filters, and the like, in particular with a cylindrical housing having a filter element, holding element, protective element, screen element, and the like that has been fixed to the inner peripheral wall of the housing using a method of the type described above.

The disclosure also relates to the use of an expansion device for performing a method of the type described above. Such an expansion device has, for example, a rotating spindle with left- and right-hand threads, with which adjusting elements exhibiting locking pins perpendicular to the spindle axis mesh. Such locking pins can be adjustable, for example by means of threaded connections, with respect to the adjusting elements.

Such an expansion device is used in that it is inserted into the housing in such a way that it covers the sheet metal seam, which is normally arranged at the lowest point in the transverse direction with respect to the seam. The locking pins of the expansion device are then moved downward so that they firmly engage the edge regions of the metal sheet, for example by hooking into the metal sheet. By turning the spindle, the adjusting elements, together with the locking pins, are then moved to the left and right at the same time so that the edge regions of the metal sheet spread apart accordingly. When the metal sheet has reached a certain spread-apart end position, it is fixed in position, for example by inserting a strip into the gap between the ends of the metal sheet, after which the locking pins are disengaged from the metal sheet, and the expansion device, possibly after moving the adjusting elements back to their original positions, can be removed from the housing.

In the method, for example, metal sheets with a thickness of 3-5 mm and having corresponding elastic properties enabling them to be bent round are used. The metal sheets may be provided with a marking to mark the location at which the expansion device is to be arranged. To enable the expansion device to engage the metal sheet, special preparations can also be made if the metal sheet does not directly have corresponding structures such as protrusions, holes, etc. For example, lugs, which are engaged by the locking pins of the expansion device, can be attached to the metal sheet.

The invention will be explained in detail below with reference to an exemplary embodiment in conjunction with the drawing. The following is shown:

DETAILED DESCRIPTION

Figure 1:
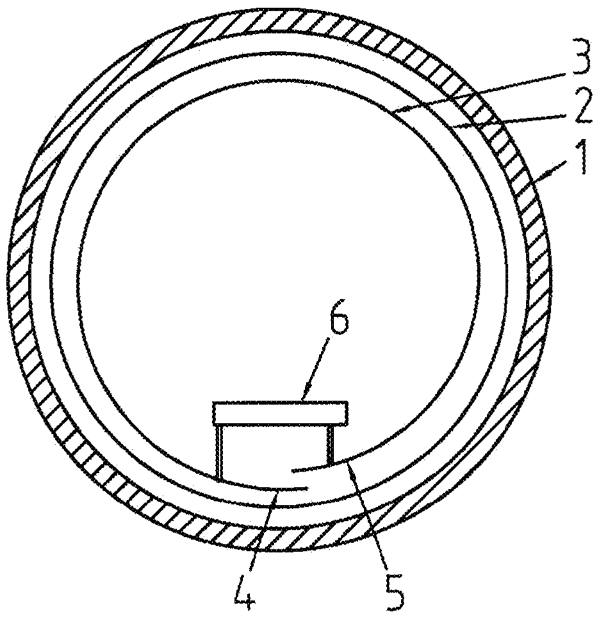
FIG. 1 is a schematic cross-section through the cylindrical housing of a centrifuge drum with a horizontal axis of rotation.

The cylindrical cross-section 1 shown in FIG. 1 is arranged horizontally and has a filter element 2 in the form of a filter cloth on its inner circumference. To protect the inside of the filter cloth, a screen plate 3 serving as protection is inserted into the housing 1 and is brought into a round shape there or beforehand such that the two axial edge regions 4,5 of the screen plate 3 overlap. The corresponding overlapping area is arranged at the lowest point of the housing.

The screen plate 3 shall now be fixed in position inside the housing. For this purpose, an expansion device 6, shown only schematically in FIG. 1, is used with which the two axial edge regions 4,5 of the screen plate 3 are spread apart in the circumferential direction until a sufficiently large gap is formed. In this position, a strip 7 is inserted into the gap in the axial direction. The strip 7 is designed so that the left and right sides each have a recess or groove into which the edges of the screen plate 3 fit. The strip 7 presses the two edges of the screen plate 3 outwards in the circumferential direction so that the screen plate 3 is pressed against the filter element 2 and thus fixed in place. The expansion device 6 is then disengaged from the edge regions of the screen plate 3 and can be taken out of the housing.

Figure 3:
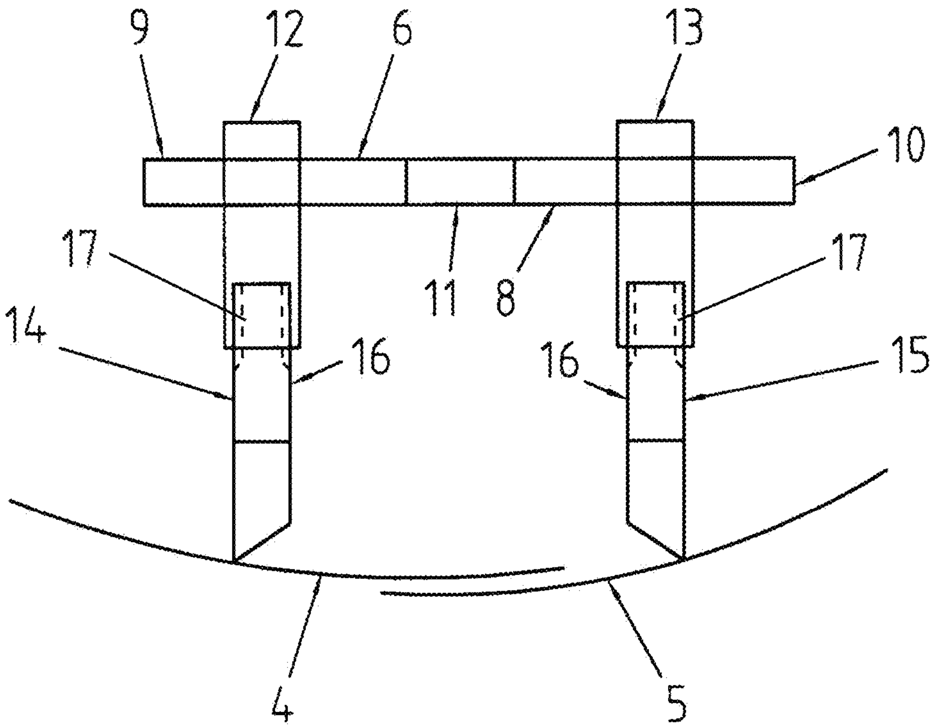
FIG. 3 is a side view of an expansion device used.

FIG. 3 shows the design of an expansion device 6 in detail. The expansion device 6 has a spindle with a left-hand thread 9 and a right-hand thread 10 at the two ends of the spindle. In the middle of the spindle there is a section 11 on which a suitable tool can engage in order to rotate the spindle.

Suitable adjusting elements 12,13, each of which bears a locking pin 14,15 extending perpendicular to the spindle axis, mesh with the corresponding threaded section 9,10. The locking pin 14,15 is connected to the adjusting element 12,13 via a threaded connection 17. One section 16 on the locking pin serves to engage a suitable assembly tool.

Each locking pin 14,15 is beveled on its tip to form a hook that can engage an opening in the edge region 4,5 of the screen plate 3.

Figure 2:
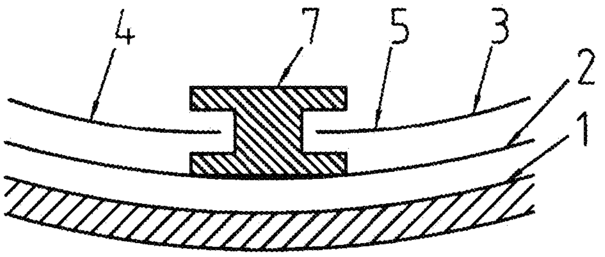
FIG. 2 shows a section from FIG. 1.

FIG. 3 shows the expansion device after insertion into the housing but before the start of the expansion process. In this state, the two adjusting elements 12,13 can be moved into a suitable position, where they can engage a corresponding hole in the screen plate for example, by rotating the spindle 6. When this position has been reached, the locking pins 14,15 are moved downwards by turning the adjusting elements 12,13 in FIG. 3 until they engage the screen plate. The actual spreading process then follows in which the spindle 6 is rotated, thus moving both adjusting elements 12,13 outwards, whereby the edge sections 4,5 of the screen plate spread apart until the end position shown in FIG. 2 is reached. In this position, the strip 7 shown in FIG. 2 is inserted, after which the locking pins 14,15 can be disengaged again. The expansion device 6 can then be removed from the housing.

To be able to insert the strip 7 into the gap between the spread-apart edge regions 4,5 of the screen plate 3, for example in the axial center of the screen plate 3, a corresponding recess is provided on both sides in the edge regions thereof, which allows two strip halves to be inserted in both directions. These strip halves can be fixed, for example, by clamping them to the screen plate 3.

The corresponding movements of the expansion device 6 can be performed manually or driven by a motor. An expansion device with motor drives is not shown here.

Figure 4:
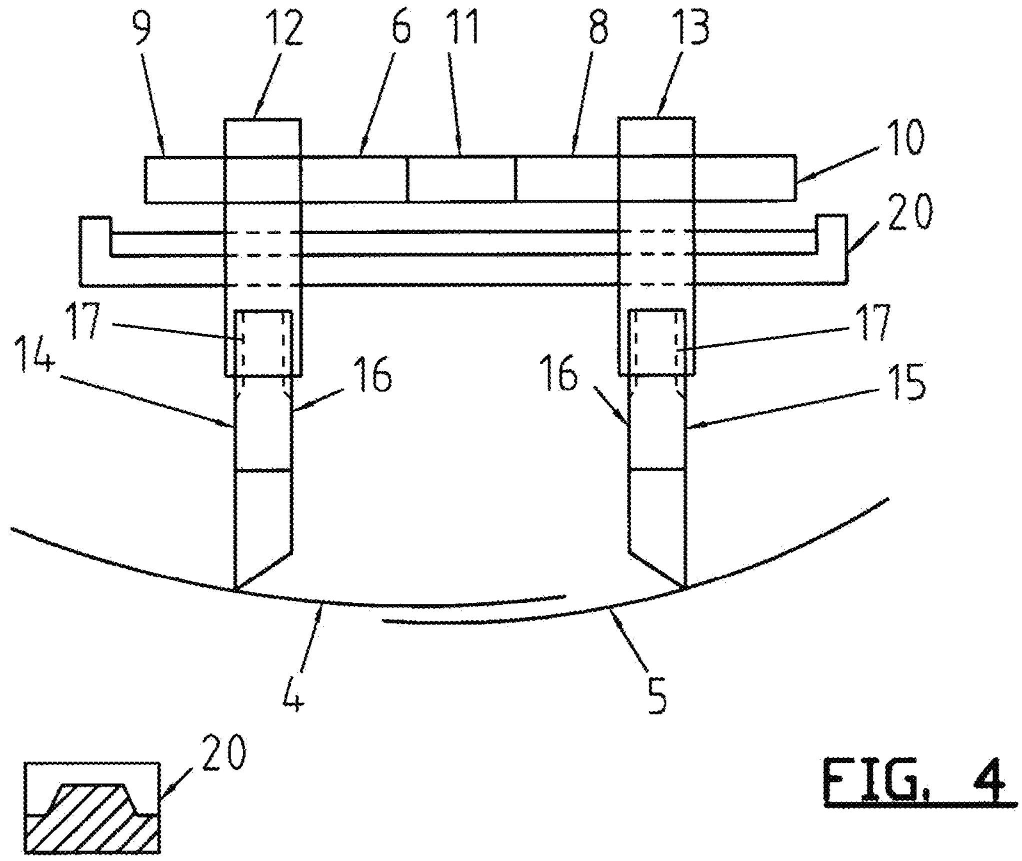
FIG. 4 shows a view like FIG. 3 of another embodiment of an expansion device.

FIG. 4 shows an embodiment of an expansion device that is additionally provided with a guide rod 20 for the adjusting elements 12,13, which exhibits a dovetail-shaped cross-section. The adjusting elements 12,13 are moved back and forth on this guide rod 20.

The invention claimed is:

1. A method for fixing a metal screen plate (3) to an inner peripheral wall of a filter device, comprising the following steps:

inserting the metal screen plate (3) into a cylindrical housing (1) of the filter device and arranging the metal screen plate (3) in a round shape on the peripheral wall of the cylindrical housing (1) inwardly of a filter cloth (2) that lines the peripheral wall of the cylindrical housing (1);

inserting an expansion device (6) into the cylindrical housing (1) and engaging the expansion device (6) with two axial edge regions (4,5) of the metal screen plate (3);

actuating the expansion device (6), thereby spreading the edge regions (4,5) apart and pressing the metal screen plate (3) against the peripheral wall of the housing (1);

fixing the metal screen plate (3) in the spread-apart position; and loosening and removing the expansion device (6).

2. The method as in claim 1, wherein the two axial edge regions (4,5) of the metal screen plate (3) overlap while inserting the metal screen plate (3) into the cylindrical housing (1).

3. The method according to claim 1, wherein the metal screen plate (3) is fixed in the spread-apart position by fastening it to the peripheral wall of the cylindrical housing (1).

4. The method according to claim 3, wherein the metal screen plate (3) is screwed to the peripheral wall.

5. The method according to claim 1, wherein the metal screen plate (3) is fixed in the spread-apart position by inserting a strip (7) between the axial edge regions (4,5) of the metal screen plate (3).

6. The method according to claim 5, wherein the strip (7) is inserted in the form of several parts.

7. The method according to claim 1, wherein the expansion device (6) has two locking pins (14,15) which can be brought into engagement with the edge regions (4,5) of the metal screen plate (3).

8. The method according to claim 1, wherein the expansion device (6) comprises a rotary spindle (8) with left- and right-hand threads (9,10), with which adjusting elements (12,13) exhibiting locking pins (14,15) perpendicular to a spindle axis mesh.

9. The method according to claim 8, wherein the locking pins (14,15) are adjustable via threaded connections with respect to the adjusting elements (12,13).

10. The method according to claim 1, wherein the filter device is a centrifuge, or a rotary filter.

11. The method according to claim 1, wherein the expansion device (6) has two locking pins (14,15) which can be hooked into holes in the edge regions (4,5) of the metal screen plate (3).

12. The method according to claim 1, wherein the metal screen plate (3) serves to protect the filter cloth (2).

13. The method according to claim 1, further comprising arranging the two axial edge regions (4,5) of the metal screen plate (3) at a lowest point in the cylindrical housing (1).

14. The method according to claim 1, wherein actuating the expansion device (6) and spreading the edge regions (4,5) apart includes pressing the metal screen plate (3) against the cloth filter (2) and thereby fixing the cloth filter (2) in place.

* * * * *